US010631265B2

(12) United States Patent
Al-kadi et al.

(10) Patent No.: US 10,631,265 B2
(45) Date of Patent: Apr. 21, 2020

(54) METHOD AND SYSTEM FOR DETERMINING THE POSITION OF A NODE

(71) Applicant: NXP B.V., Eindhoven (NL)

(72) Inventors: Ghiath Al-kadi, Graz (AT); Michael Schober, Graz (AT); Ulrich Andreas Muehlmann, Graz (AT); Brima Babatunde Ibrahim, Laguna Hills, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/433,155

(22) Filed: Jun. 6, 2019

(65) Prior Publication Data
US 2019/0394748 A1    Dec. 26, 2019

(30) Foreign Application Priority Data

Jun. 22, 2018 (EP) .................................. 18179209

(51) Int. Cl.
| | |
|---|---|
| *H04W 64/00* | (2009.01) |
| *H04W 56/00* | (2009.01) |
| *H04W 24/10* | (2009.01) |
| *H04B 17/318* | (2015.01) |
| *H04W 4/80* | (2018.01) |
| *H04B 17/336* | (2015.01) |
| *H04L 1/16* | (2006.01) |

(52) U.S. Cl.
CPC ........ *H04W 64/006* (2013.01); *H04B 17/318* (2015.01); *H04B 17/336* (2015.01); *H04L 1/1685* (2013.01); *H04W 4/80* (2018.02); *H04W 24/10* (2013.01); *H04W 56/0055* (2013.01)

(58) Field of Classification Search
CPC .......... H04W 64/006; H04W 56/0055; H04W 24/10; H04W 4/80; H04B 17/318; H04B 17/336; H04L 1/1685
See application file for complete search history.

(56) References Cited

U.S. PATENT DOCUMENTS

| | | | | |
|---|---|---|---|---|
| 2009/0149198 A1* | 6/2009 | Nam | ...................... | G01S 5/0289 455/456.2 |
| 2013/0273938 A1* | 10/2013 | Ng | ........................ | H04W 64/00 455/456.1 |

(Continued)

FOREIGN PATENT DOCUMENTS

WO    WO-2009/110669 A1    9/2009

*Primary Examiner* — Minjung Kim

(57) ABSTRACT

In accordance with a first aspect of the present disclosure, a method for determining the position of a node in a communication network is conceived, wherein said network comprises said node and a plurality of anchors, the method comprising: the node transmits a poll message to the plurality of anchors; a first anchor of said plurality transmits a response message to the node and to one or more other anchors of said plurality of anchors; a processing unit calculates the position of the node using timing information of the poll message transmission by the node, of the poll message reception by the plurality of anchors, of the response message transmission by the first anchor, and of the response message reception by the node and the other anchor or anchors. In accordance with other aspects of the present disclosure, a corresponding computer program and a corresponding system for determining the position of a node in a communication network is provided.

16 Claims, 8 Drawing Sheets

(56) References Cited

U.S. PATENT DOCUMENTS

2017/0123039 A1* 5/2017 Shin .................. G01S 5/0072
2017/0164318 A1 6/2017 Smith
2017/0205493 A1* 7/2017 Ciholas ............. G01S 5/0289
2018/0045807 A1 2/2018 Senna et al.
2018/0165947 A1* 6/2018 Wang .................. G08C 17/02
2018/0356492 A1* 12/2018 Hamilton ............ G01S 13/76

* cited by examiner

METHOD AND SYSTEM FOR DETERMINING THE POSITION OF A NODE

CROSS-REFERENCE TO RELATED APPLICATIONS

This application claims priority under 35 U.S.C. § 119 to European Patent Application No. 18179209.4, filed on Jun. 22, 2018, the contents of which are incorporated by reference herein.

OVERVIEW

The present disclosure relates to a method for determining the position of a node in a communication network, for example in an ultra-wideband (UWB) communication network. Furthermore, the present disclosure relates to a corresponding system for determining the position of a node in a communication network, for example in a UWB communication network. UWB communication networks are often used to determine the two-dimensional or three-dimensional position of a node, for example in a building or another structure. In general, the node's position should be determined quickly and accurately, without requiring a lot of processing resources.

SUMMARY

In accordance with a first aspect of the present disclosure, a method for determining the position of a node in a communication network is conceived, wherein said network comprises said node and a plurality of anchors, the method comprising: the node transmits a poll message to the plurality of anchors; a first anchor of said plurality transmits a response message to the node and to one or more other anchors of said plurality of anchors; a processing unit calculates the position of the node using timing information of the poll message transmission by the node, of the poll message reception by the plurality of anchors, of the response message transmission by the first anchor, and of the response message reception by the node and the other anchor or anchors.

In an embodiment, the communication network is an ultra-wideband communication network.

In an embodiment, the timing information comprises timestamps.

In an embodiment, the processing unit is comprised in the node, in one of the plurality of anchors or in an external device.

In an embodiment, the timing information is transmitted to the processing unit through said communication network or through a further communication network.

In an embodiment, the anchors perform regular time-of-flight measurements between each other to determine the distance between each other.

In an embodiment, the method further comprises selecting the first anchor from the plurality of anchors in dependence on the strength or the quality of a probing signal received by the plurality of anchors.

In an embodiment, selecting the first anchor comprises: the node transmits the probing signal to the anchors through a further communication network; each anchor determines a signal strength or quality parameter value of the probing signal, resulting in a plurality of signal strength or quality parameter values; the anchors exchange said strength or quality parameter values between each other; the anchors select the anchor that has provided the highest signal strength or quality parameter value as the first anchor.

In an embodiment, selecting the first anchor comprises: the node transmits the probing signal to the anchors through a further communication network; each anchor determines a signal strength or quality parameter value of the probing signal, resulting in a plurality of signal strength or quality parameter values; the anchors transmit said strength or quality parameter values to a processing unit; the processing unit selects the anchor that has provided the highest signal strength or quality parameter value as the first anchor.

In an embodiment, the further communication network is a ZigBee network, a Bluetooth low energy network, or a Wi-Fi network.

In an embodiment, the signal strength or quality parameter value is a received signal strength indicator, RSSI, value, or a signal-to-noise ratio, SNR, value.

In an embodiment, selecting the first anchor is repeated at regular intervals.

In accordance with a second aspect of the present disclosure, a computer program is provided, comprising executable instructions that, when executed, carry out or control a method of the kind set forth.

In an embodiment, a non-transitory computer-readable medium comprises a computer program of the kind set forth.

In accordance with a third aspect of the present disclosure, a system for determining the position of a node in a communication network is provided, the system comprising said network and a processing unit, wherein said network comprises said node and a plurality of anchors, wherein: the node is configured to transmit a poll message to the plurality of anchors; a first anchor of said plurality is configured to transmit a response message to the node and to one or more other anchors of said plurality of anchors; the processing unit is configured to calculate the position of the node using timing information of the poll message transmission by the node, of the poll message reception by the plurality of anchors, of the response message transmission by the first anchor, and of the response message reception by the node and the other anchor or anchors.

DESCRIPTION OF DRAWINGS

Embodiments will be described in more detail with reference to the appended drawings, in which.

DESCRIPTION OF EMBODIMENTS

UWB communication networks are often used to determine the two-dimensional or three-dimensional position of a node, for example in a building or another structure. In general, the node's position should be determined quickly and accurately, without requiring a lot of processing resources.

UWB-based indoor position determination systems often use either Two-Way Ranging (TWR) or a Time Difference of Arrival (TDOA) measurement for estimating the position of a node. Although TWR offers a low system complexity and high accuracy, especially when the clock drift is compensated, the processing cost is high, because for every distance measurement two messages should be sent. If a high stability of a position determination system is desired, a high redundancy is needed, which results in a high number of anchors. Since two messages are needed for every distance measurement the number of messages is directly proportional to the number of anchors in a system and directly proportional to the number of nodes. This high number of messages results in a high energy consumption and a reduced number of maximum nodes in the system, due to the limited channel capacity.

Figure 1:
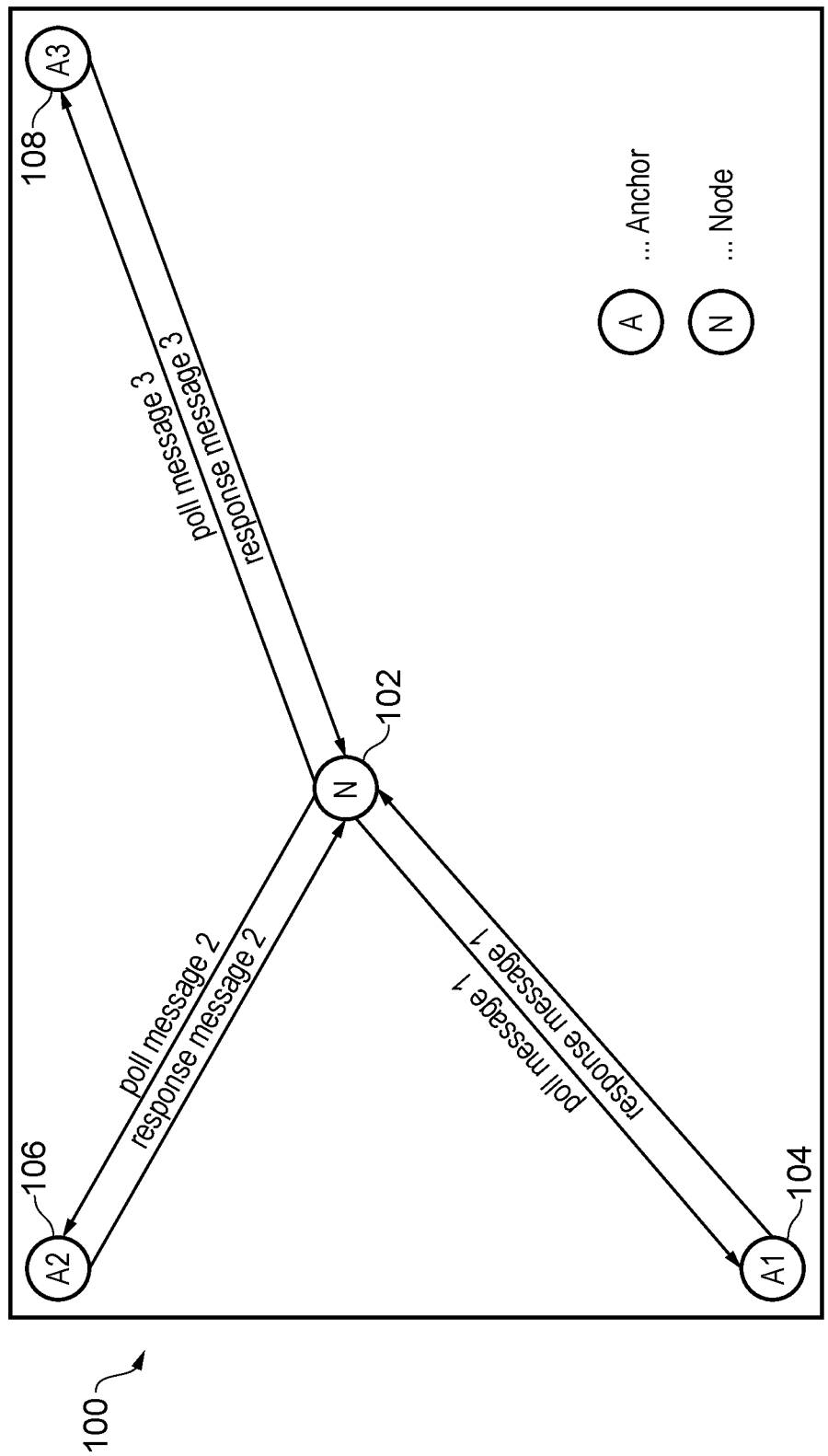
FIG. 1 shows an example of a UWB communication network.

FIG. 1 shows an example of a UWB communication network 100. In particular, it shows a network 100 in which the position of a node 102 is determined using TWR. Three anchors 104, 106, 108 are used for determining said position. The anchors may for example fixed network nodes, which are exclusively or non-exclusively used for determining the position of node 102. The node 102 whose position is determined may for example be a mobile device or a wireless sensor node. Other examples of nodes or devices whose position should be determined are: a phone or tablet, a car key or a door key, a remote control, a device for tracking children, a robot that needs to be tracked, a device for tracking animals, and any good that needs to be tracked such as a package that needs to be shipped.

FIG. 1 shows the message exchange between one node 102 and three anchors 104, 106, 108. The node 102 initializes the ranging by sending a poll message and the anchors 104, 106, 108 respond by sending a response message. This results in 6 messages that should be sent. In a tracking system the measured distanced between the anchors 104, 106, 108 and the node 102 can be combined with the position of the anchors 104, 106, 108, and a trilateration scheme can be applied. Trilateration is a method for determining the position of a node with the known distances between the node and several fixed anchors whose positions are known. The measurement data may be transmitted to a central point or device, which calculates the position of the node using the measurement data. The measurement data may comprise timestamps of the poll message transmissions, poll message receptions, response message transmissions, and response message receptions. For the centralization of the measurement data a separate wired or wireless network can be used; this reduces the pollution of the UWB measurement channels. Depending on the application (e.g. indoor navigation) also the node 102 needs to know its position. Thus, the node's position should be communicated to the node.

Several methods can be used for communicating the position to the node:
- another communication channel can be used for the position exchange between the node and the system, which results in additional hardware costs;
- the node can be informed about its position using an additional message transmitted through the UWB communication network, which means that less measurements can be done using the UWB communication network;
- the position can be exchanged in the next ranging session, which means that no additional channel capacities are needed, but the node will always have the position of the previous measurement.

The decision on how the position of the node is exchanged may depend on the application and on the hardware, which is available in a node in view of any additional functionality that the node may have to offer. Note that a node is usually not able to determine its own position, but its position may be determined by the anchors. This makes a system of the kind set forth particularly suitable for real-time tracking of assets, for example. On the application level, if the node needs to know its position, an additional message should often be sent from a master anchor to the node. In order to do so, the other anchors often need to share the data measurements with a backbone network, for example. This can be done through a different channel and/or through a different communication network.

Figure 2:
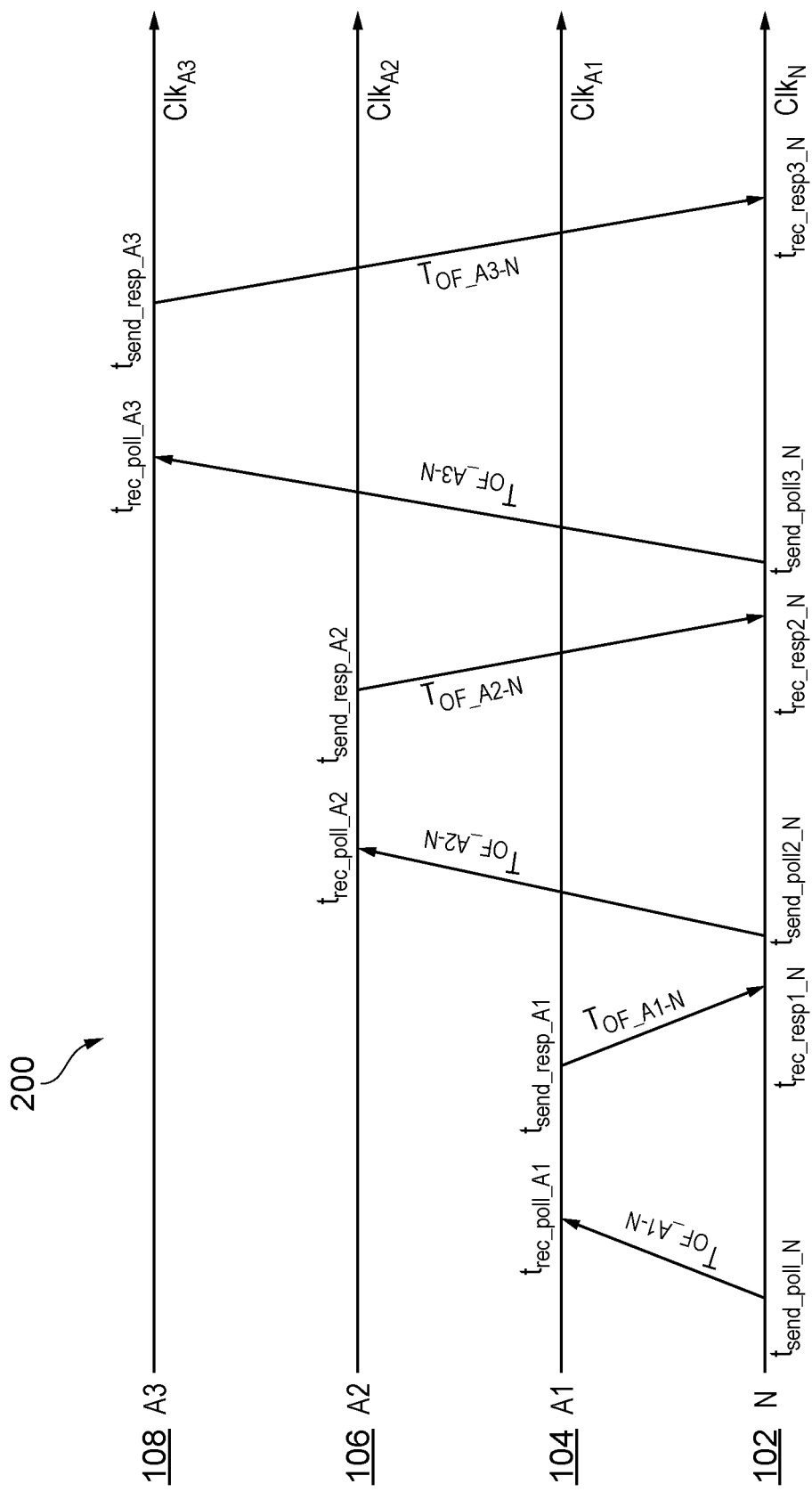
FIG. 2 shows an example of a timing diagram.

FIG. 2 shows an example of a timing diagram 200. In particular, it shows which timestamps are recorded for determining the position of the node 102 in the UWB communication network 100 shown in FIG. 1. As an example, the timestamp $t_{send\_poll1\_N}$ represents the time at which the node 102 transmits a poll message to the first anchor 104, and the timestamp $t_{rec\_poll\_A1}$ represents the time at which the first anchor 104 receives said poll message. For calculating the time-of-flight (TOF) between one node and one anchor four timestamps are needed, because the timestamps are taken on different clocks, so only the timestamp on one side (either the anchor or the node) can be used for calculating a relative time difference. This means that for calculating the TOF the following calculation should be performed: TOF_A1–N=(($t_{rec\_resp1\_N}-t_{send\_poll1\_N}$)–($t_{rec\_poll\_A1}-t_{rec\_poll\_A1}$))/2. In this way, the TOF is calculated in TWR systems. Because by applying this formula the clocks do not need to be synchronized, the clocks only need to be able to take accurate timestamps. Basically two messages are needed, i.e. the request message and the response message, which results in 4 timestamps ($t_{send\_poll1\_N}$, $t_{rec\_poll\_A1}$, $t_{send\_resp\_A1}$ and $t_{rec\_resp1\_N}$) for calculating the TOF_A1–N. The time of flight of the request message is the same as the time of flight of the response message, because of the small delay in time. The time-of-flight of the other four messages, as shown in FIG. 2, can be calculated in an analogous manner. These timestamps and the time-of-flight data derived therefrom can subsequently be used to calculate the position of the node.

Figure 3:
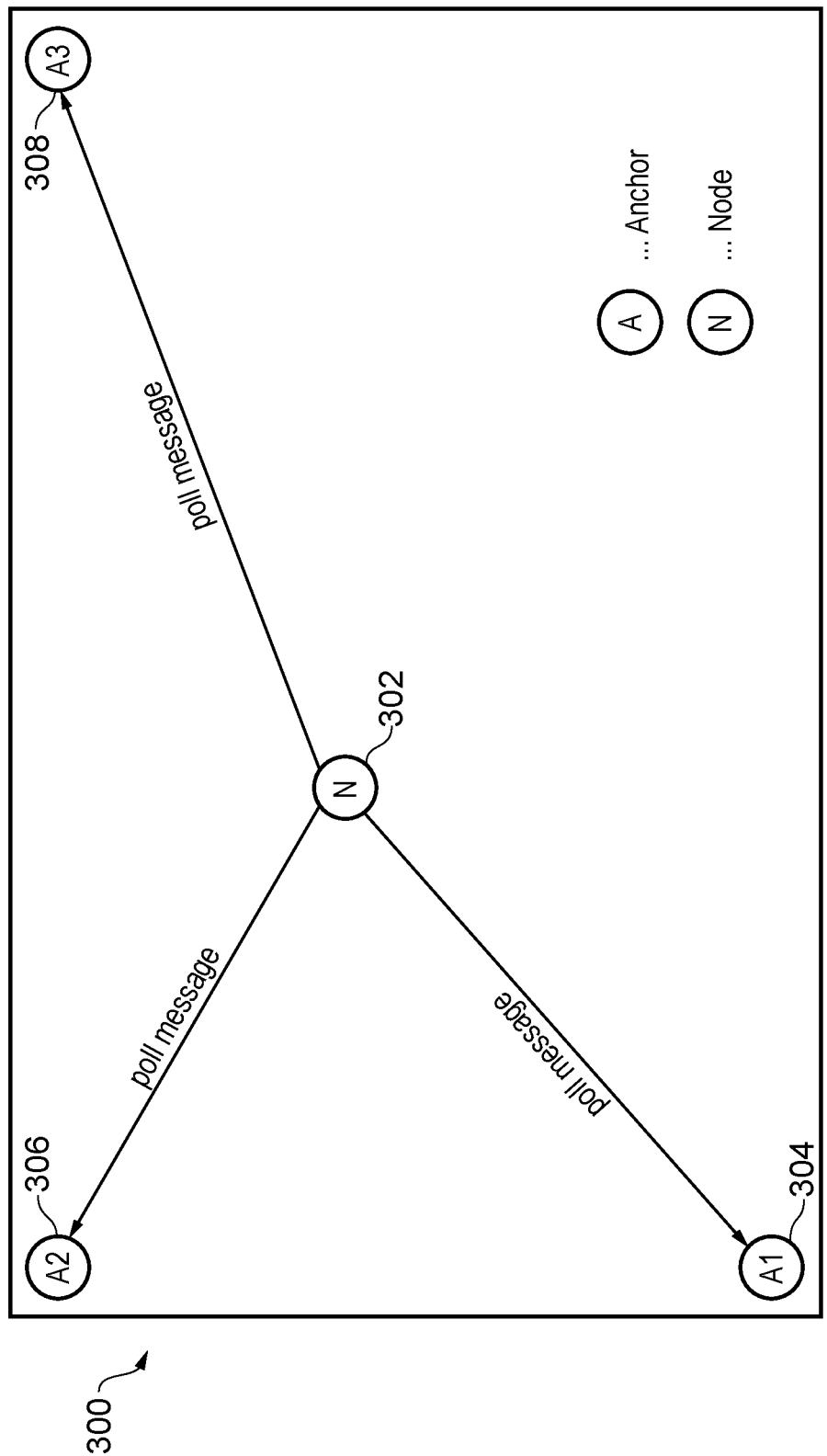
FIG. 3 shows another example of a UWB communication network.

In this example, six messages should be transmitted. Generally speaking, the number of messages that should be transmitted in a TWR system in order to determine the position of a node may be expressed as:

$$N_{messages} = \#nodes * \#anchors * 2 \qquad (1)$$

wherein:
$N_{messages}$ is the number of messages that should be sent
nodes is the number of nodes in the system
anchors is the number of anchors in the system FIG. 3 shows another example of a UWB communication network 300. In particular, it shows a network 300 in which the position of a node 302 is determined using TDOA. The difference between TDOA and TWR is that in a TDOA measurement only the node 302 needs to send a message, which is received by all the anchors 304, 306, 308. This means that the number of messages that should be sent is proportional to the number of nodes that should be located, i.e. whose position should be determined. In other words, the number of messages that should be sent is independent from the number of anchors. This small number of messages that need to be sent results in a higher maximum number of nodes that can be located by the anchors.

If TDOA is used, the detection of the time differences between the receptions of the respective messages should happen with a high accuracy, which means that the clock of the anchors may rarely drift and should be synchronized periodically. The synchronization can be performed by using a shared clock or by using a wireless synchronization scheme. This means that the system complexity and the hardware costs increase significantly compared to TWR. Also, a three-dimensional position determination is only possible by using at least four anchors. In addition, the accuracy of the TDOA measurement is worse than the accuracy of the TWR, because the whole position determination is done based on relative time differences of the message reception. Furthermore, the clock drift on the anchor side decreases the accuracy. Based on just one relative timestamp no absolute distance between an anchor and the node can be calculated without knowing also the other timestamps of the system. This means that the whole TDOA measurement depends on the comparison of timestamps, which may result in an instable and inaccurate system. If for example only one timestamp was erroneous or not taken in a line-of-sight (LOS), the whole position calculation and distance calculation between the anchors and the node may be negatively affected. Also, by using TDOA measurement a higher number of nodes in line-of-sight is needed for a three-dimensional position determination. Therefore, in case of a limited number of anchors, the TDOA measurement system is less stable than a TWR-based indoor position determination system. For example, a TDOA-based positioning system with just three anchors in LOS wouldn't be able to localize a node, while a TWR based system would be able to.

FIG. 3 shows the message exchange between one node 302 and three anchors 304, 306, 308. The node 302 starts the ranging by sending a poll message, which is received by all the anchors 304, 306, 308. No further message exchange is needed for the position determination, because the timestamps can be shared on any wired or wireless channel that consumes less power or has a higher capacity. Generally speaking, the number of messages that should be transmitted in a TDOA system in order to determine the position of a node may be expressed as:

$$N_{messages} = \#nodes \quad (2)$$

Figure 4:
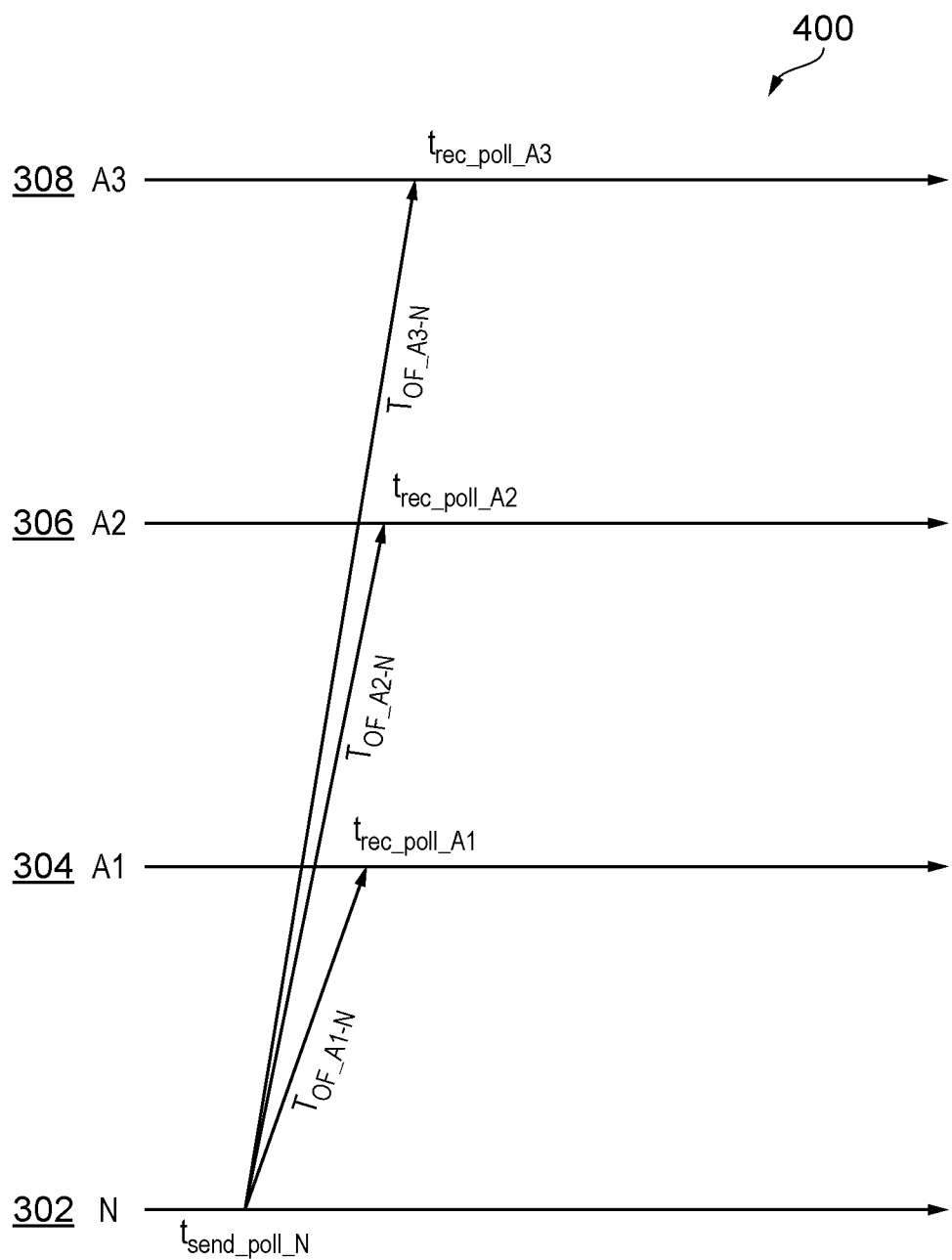
FIG. 4 shows another example of a timing diagram.

FIG. 4 shows another example of a timing diagram 400. In particular, it shows which timestamps are recorded for determining the position of the node 302 in the UWB communication network 300 shown in FIG. 3. As an example, the timestamp $t_{send\_poll\_N}$ represents the time at which the node 302 transmits a poll message to the first anchor 304, and the timestamp $t_{rec\_poll\_A1}$ represents the time at which the first anchor 304 receives said poll message. The different $t_{rec\_poll}$ timestamps shown in FIG. 4 can be used in a multilateration scheme similar to GPS, but the TOFs between the node and the anchors cannot be calculated unless the node and the anchors are synchronized, which is very difficult to achieve as a result of the drifting clocks. Basically, in TDOA systems, the different TOFs result in a different message reception time, which can be used to determine the position of the node. For TDOA a direct TOF calculation isn't possible; therefore multilateration is needed.

Summarizing, the key challenges in TWR are that the system is limited by the channel capacity, which in turn limits the number of nodes that can be served, while TDOA has the limitation of the required cross-anchor time synchronizations, which add complexity to the backbone network for time synchronizations, and the limitation that the system can only provide a meaningful information when all anchors are LOS towards the node. Now discussed are a method and system for determining the position of a node, in which at least some of the above-mentioned limitations are overcome. In particular, the presently disclosed method and system combines the advantages of TWR and TDOA by reducing the number of poll message-response message exchanges, but not excluding them entirely: such an exchange is only performed between the node and a first anchor out of a plurality of anchors. This means that the accuracy is as good as the accuracy of TWR, but the number of messages that should be sent is proportional to the number of nodes in the system, which leads to a measurement speed that is comparable to TDOA. The other anchors do not respond to the node; instead, the first anchor transmits a response message also to the other anchors. Using the timestamps of the reception of this response message by these other anchors, the node's position can still be accurately determined. Note that the first anchor is also referred to as the "responding anchor" herein, and the other or other anchors as the "passive anchors". Furthermore, note that there may be more than one responding anchor in the system, but in that case the advantage over TWR and TDOA may be smaller compared to a system with only one responding anchor.

Figure 5A:
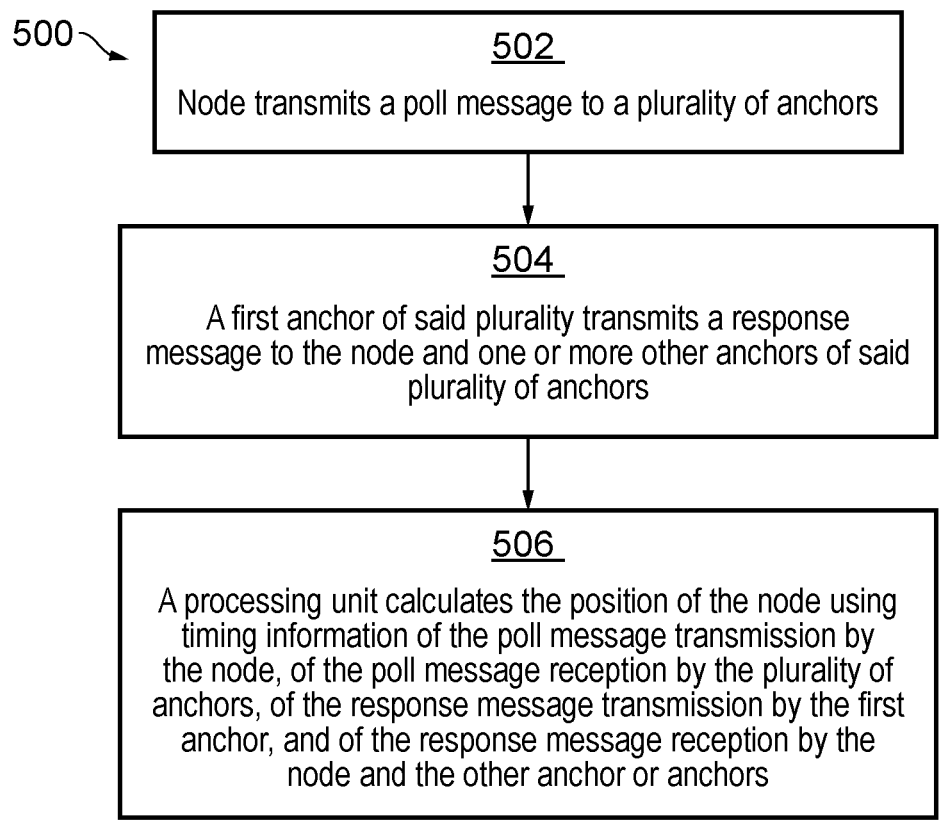
FIG. 5A shows an illustrative embodiment of a method for determining the position of a node.

FIG. 5A shows an illustrative embodiment of a method 500 for determining the position of a node in an UWB communication network of the kind set forth. The method 500 comprises, at 502, that the node transmits a poll message to a plurality of anchors. Furthermore, the method 500 comprises, at 504, that the first anchor of said plurality transmits a response message to one or more other anchors of said plurality of anchors. Furthermore, the method 500 comprises, at 506, that a processing unit calculates the position of the node using timing information of the poll message transmission by the node, of the poll message reception by the plurality of anchors, of the response message transmission by the first anchor, and of the response message reception by the node and the other anchor or anchors. In a practical and effective implementation, the timing information comprises timestamps. It is noted that the presently disclosed method is not limited to UWB communication network, i.e. it may in principle also be applied in other communication networks in which the position of a node should be determined.

Figure 5B:
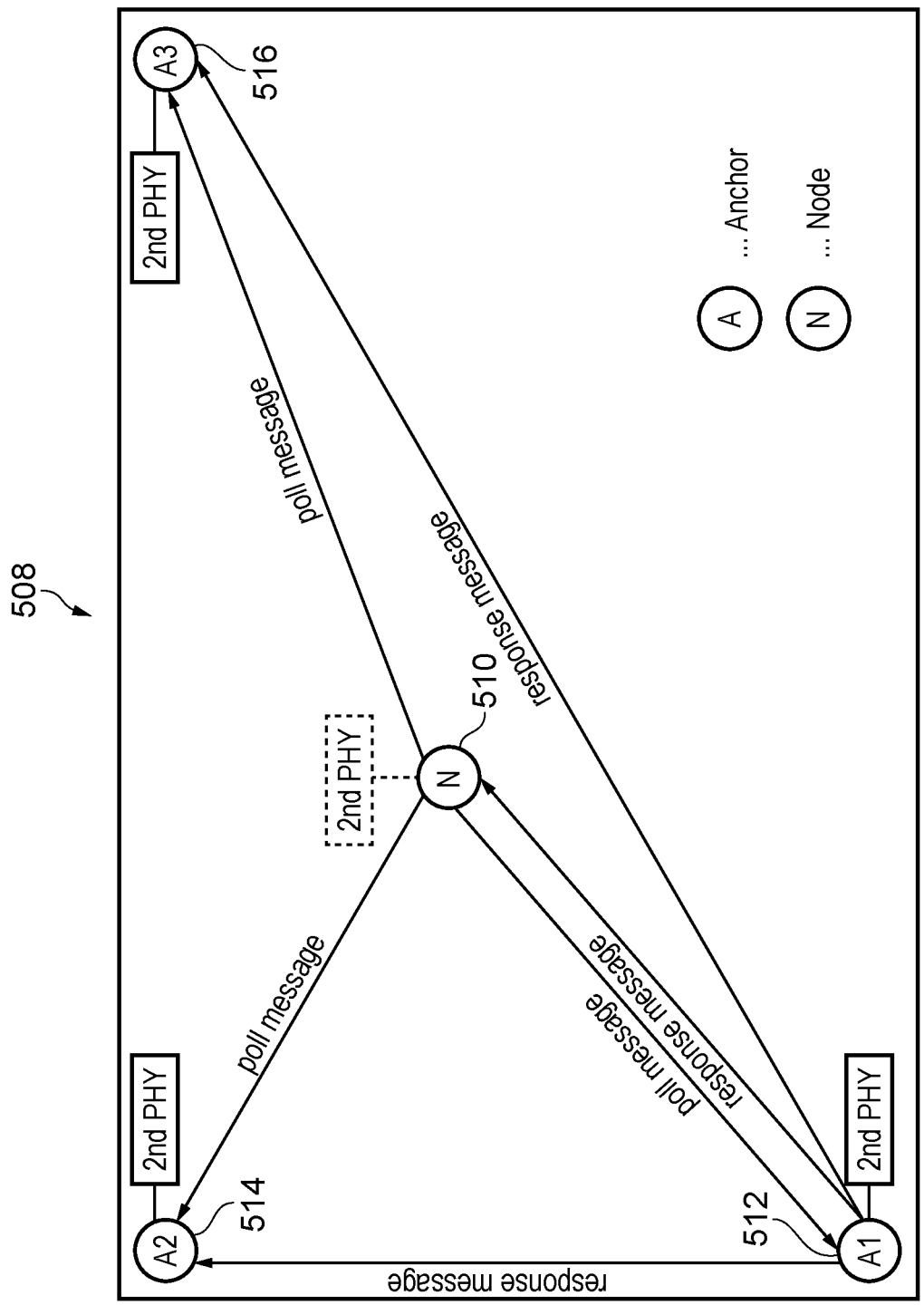
FIG. 5B shows an illustrative embodiment of a UWB communication network.

FIG. 5B shows an illustrative embodiment of a UWB communication network 508. The node 510 and the first anchor 512 (i.e., the responding anchor) effectively perform a TWR distance measurement, in which the node 510 transmits a poll message and the first anchor 512 responds with a response message. The other anchors 514, 516 (i.e., the passive anchors) receive a poll message from the node 510 as well as a response message transmitted by the first anchor 512. Thus, the first anchor 512 and the node 510 can store one message receive timestamp and one message send timestamp. The other anchors 514, 516 can store two receive timestamps. The decision which of the anchors is responding i.e., which of the anchors 512, 514, 516 should act as the first anchor can be based on random selection, on a node position based algorithm, or on a signal strength or signal quality based algorithm as further elaborated hereinbelow. The latter means, for example, that the anchor which is closest to the node is selected as the first anchor. It may be assumed that the anchors are static and that the distance or TOF between the anchors is known or had been measured after the position of the anchors has changed. The anchors could also perform among each other low-repetition regular TOF measurements, e.g. once a day. The measurement of the distance between the anchors can be done by using for example TWR; for increasing the accuracy of the TWR an averaging of several measurements can be done. Thus, in an embodiment, the anchors perform regular time-of-flight measurements between each other to determine the distance between each other. These measured distances may be taken into account when the node's position is determined. In this way, the node's position may be determined with a higher accuracy.

In an embodiment, the processing unit is comprised in the node, in one of the plurality of anchors or in an external device. The external device may for example for part of a backbone network. In a practical and effective implementation, the timestamps are transmitted to the processing unit through a further communication network. In this way, the UWB communication network can be fully deployed for the poll and response message transmissions. The further communication network (referred to as a secondary channel "$2^{nd}$ PHY" in FIG. 5B) may for example be a ZigBee network, Bluetooth low energy (BLE) network, or a Wi-Fi network. Alternatively, the timestamps may be transmitted to the processing unit partially through the UWB communication network. In this way, no further communication network would be required on the node side. To maximize the number of ranging operations, however, the anchors may still be connected through a further communication network.

Figure 6:
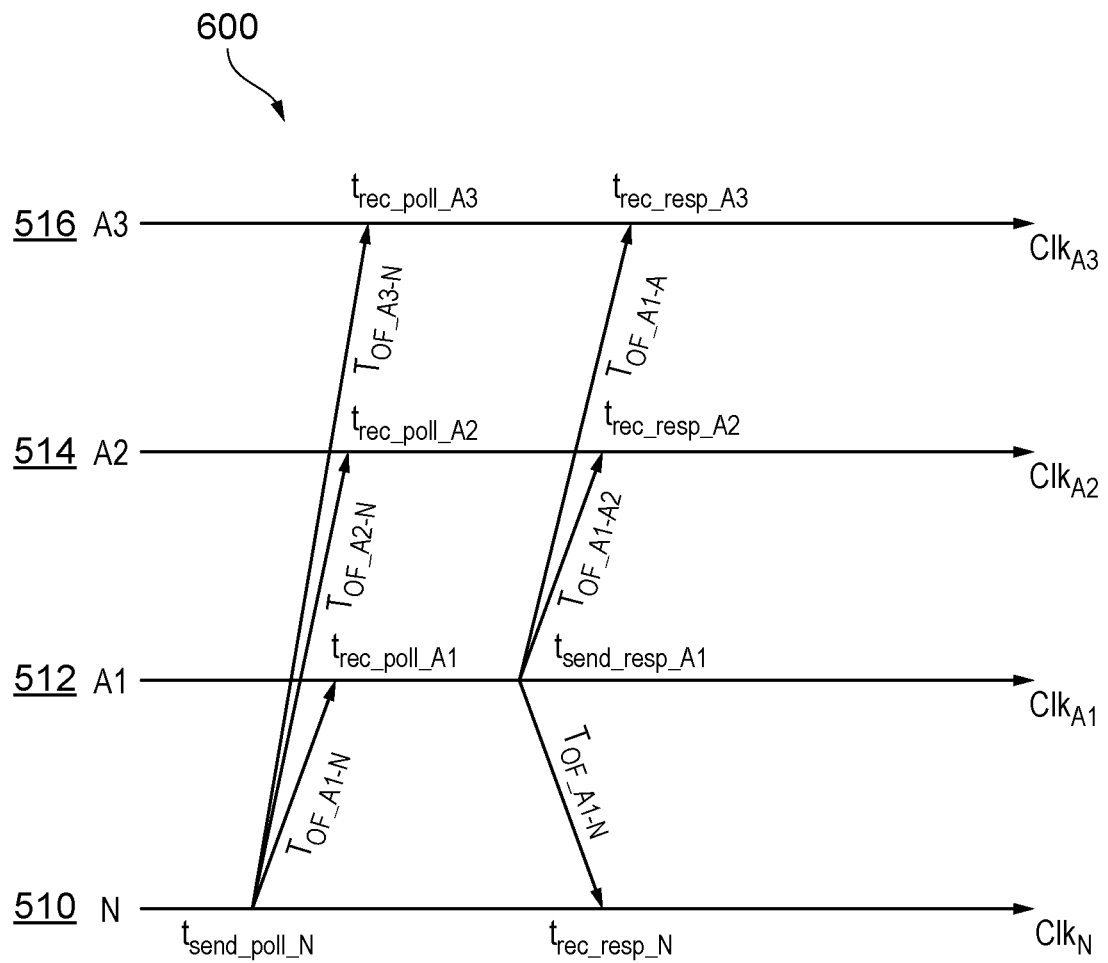
FIG. 6 shows an illustrative embodiment of a timing diagram.

FIG. 6 shows an illustrative embodiment of a timing diagram 600. In particular, it shows which timestamps are recorded for determining the position of the node 510 in the UWB communication network 508 shown in FIG. 5B. As an example, the timestamp $t_{send\_poll\_N}$ represents the time at which the node 510 transmits a poll message to the first anchor 512, and the timestamp $t_{rec\_poll\_A1}$ represents the time at which the first anchor 512 receives said poll message. For calculating the time-of-flight (TOF) between the node 510 and the first anchor 512 four timestamps are needed. The timestamps and the TOF data derived therefrom can be used to calculate the position of the node. Note that the distance between the node 510 and the passive anchors 514, 516 can be calculated only if the TOF between the node 510 and the first anchor 512 (i.e. the responding anchor) is known. Note that the anchors 514 and 516 are passive parts of the system, which means that they are only receiving messages. The presently disclosed method can be used with at least two anchors; there is no maximum number of anchors. In FIG. 6, the following representations are used:

$t_{rec\_resp\_A3}$ . . . timestamp when anchor A3 receives the response message $t_{rec\_poll\_A3}$ . . . timestamp when anchor A3 receives the poll message $t_{rec\_resp\_A2}$ . . . timestamp when anchor A2 receives the response message $t_{rec\_poll\_A2}$ . . . timestamp when anchor A2 receives the poll message $t_{send\_resp\_A1}$ . . . timestamp when anchor A1 sends the response message $t_{rec\_poll\_A1}$ . . . timestamp anchor A1 receives the poll message $t_{rec\_resp\_N}$ . . . timestamp when the node N receives the response massage $t_{send\_poll\_N}$ . . . timestamp when the node N sends the response message $T_{OF\_A1-N}$ . . . Time of Flight between anchor A1 and the node N $T_{OF\_A2-N}$ . . . Time of Flight between anchor A2 and the node N $T_{OF\_A3-N}$ . . . Time of Flight between anchor A3 and the node N $T_{OF\_A1-A2}$ . . . Time of Flight between anchor A1 and the anchor A2

$T_{OF\_A1-A3}$ . . . Time of Flight between anchor A1 and the anchor A3

Generally speaking, the number of messages that should be transmitted in the presently disclosed system in order to determine the position of a node may be expressed as:

$$N_{messages} = \#nodes * 2 \qquad (3)$$

wherein:

$N_{messages}$ is the number of messages that must be sent
\# nodes is the number of nodes in the system It is noted that the timestamps of anchors are taken on different clocks, which means that only relative timings are used in the equations. This may be compensated by using the TOF information between the anchors and by using the message emitted by the responding anchor as a reference. Now an example of an equation system that can be setup for calculating the TOF between the third anchor 516 (A3) and the node 510 (N) will be given. The calculation of the TOF between any other anchor and the node 510 may be done in the same way.

$$T_{OF_{A1-N}} = \frac{(t_{rec\_resp\_N} - t_{send\_poll\_N}) - (t_{send\_resp\_A1} - t_{rec\_poll\_A1})}{2} \qquad (4)$$

$$t_{rec\_resp\_A3} = t_{send\_poll\_N} + T_{OF_{A1-N}} + T_{process\_A1} + T_{OF\_A1-A3} \qquad (5)$$

$$t_{send\_poll\_N} = t_{rec\_poll\_A3} - T_{OF\_A3-N} \qquad (6)$$

$$T_{process\_A1} = t_{send\_resp\_A1} - t_{rec\_poll\_A1} \qquad (7)$$

wherein:

$T_{process\_A1}$ = the time that anchor A1 needs for the preparation of the response message This equation system results in:

$$t_{rec\_resp\_A3} = t_{rec\_poll\_A3} - T_{OF\_A3-N} + T_{OF\_A1-N} + t_{send\_resp\_A1} - t_{rec\_poll\_A1} + T_{OF\_A1-A3} \qquad (8)$$

The TOF between the node 510 (N) and the anchor 516 (A3) can be calculated with the following equation:

$$T_{OF\_A3-N} = t_{rec\_poll\_A3} - t_{rec\_resp\_A3} + T_{OF_{A1-N}} + t_{send\_resp\_A1} - t_{rec\_poll\_A1} + T_{OF\_A1-A3} \qquad (9)$$

Since the TOF between the anchors is known every timestamp and TOF on the right side of equation (9) is known, which means that the TOF between the node 510 and the third anchor 516 can be calculated. The exchange of the TOF information, which is only known on the node side, may be done by using another data channel i.e. a further communication network such as ZigBee, Bluetooth low energy or Wi-Fi, which may be more power efficient—or using the UWB interface. If the exchange is done on the UWB interface, it can be done by sending an additional message or by sending the TOF in the poll message of a next ranging session.

The presently disclosed method has the accuracy of TWR, but also the speed of TDOA. This means that even if the one distance measurement was none line-of-sight (NLOS), the rest of the distance measurements are still valid and can be used for the calculation of the nodes position. This method can be also used merely for fast distance measurements, for example for platooning of trucks. Also for three-dimensional positioning only three anchors are needed, instead of four which is the case for TDOA. The anchors do not need to be synchronized, because the timestamp of the responding anchor can be used as a reference, which reduces the complexity and costs of the system. Furthermore, the presently disclosed method enables a reduction of the power consumption of the node, because it should only send one poll message and receive one response message. If the node would start receiving the message, the power consumption would increase significantly on the node side, because the node should be turned on in order to wait for the poll message of an anchor. For this reason, the presently disclosed method is power efficient on the node side, which is important if a small-size battery-driven node is used.

In an embodiment, the method further comprises selecting the first anchor from the plurality of anchors in dependence on the strength or the quality of a probing signal received by the plurality of anchors. In this way, the most suitable anchor may be selected as the first anchor (i.e., the responding anchor). For instance, the anchor that is best able to receive the probing signal may be selected as the responding anchor: it is probably that this anchor will subsequently also be able to receive the poll message from the node. For saving energy on the node side, it is important that no message is dropped between the node and the anchor. Also tracking algorithms become less stable or reliable when the time offset between the measurements increases, which is likely to happen if messages are dropped. By selecting the most suitable responding anchor using a probing signal, the likelihood that messages are dropped between the node and the responding anchor may be reduced.

In an embodiment, selecting the first anchor comprises: the node transmits the probing signal to the anchors through a further communication network; each anchor determines a signal strength or quality parameter value of the probing signal, resulting in a plurality of signal strength or quality parameter values; the anchors exchange said strength or quality parameter values between each other; the anchors select the anchor that has provided the highest signal strength or quality parameter value as the first anchor. This embodiment results in a practical and effective implementation. Furthermore, since the probing signal is transmitted through a further communication network, the UWB communication network is not polluted. For example, if a first anchor receives the probing signal with an RSSI value of −70 dB and a second anchor receives the probing signal with an RSSI value of −50 dB, then the second anchor should become the responding anchor because of the higher signal power. A higher signal power normally implies a higher signal quality, which will result a lower message drop rate.

In an alternative embodiment, selecting the first anchor comprises: the node transmits the probing signal to the anchors through a further communication network; each anchor determines a signal strength or quality parameter value of the probing signal, resulting in a plurality of signal strength or quality parameter values; the anchors transmit said strength or quality parameter values to a processing unit; the processing unit selects the anchor that has provided the highest signal strength or quality parameter value as the first anchor. This embodiment also results in a practical and effective implementation. In addition, no further communication network is required. In this alternative embodiment, a processing unit comprised in an external device may select the responding anchor, instead of the anchors. For instance, indoor-positioning systems may have a central server with which the anchors communicate. This unit (e.g. a company door lock system server) may thus select a responding anchor for a node whose position should be determined.

The further communication network may for example be a ZigBee network, a Bluetooth low energy network, or a Wi-Fi network. Furthermore, in a practical and effective implementation, the signal strength or quality parameter value is a received signal strength indicator (RSSI) value, or a signal-to-noise ratio (SNR) value. A good signal quality estimation is the SNR or signal strength; for UWB ranging messages the signal strength of the first path is the most important one, because it is the first path which is used for the distance estimation. Every anchor can measure the signal quality of the received poll message from the node. Based on this measurement any wired or wireless communication interface between the anchors can be used for determining which anchor should be responding. The responding anchor may be the one with the best signal quality, because then the probability of dropping the message will be the lowest. If the secondary communication interface between the anchors is not fast enough for exchanging or using the signal quality information for the determination of the response anchor of the current message exchange, it can be used for the next message exchange. In an embodiment, selecting the first anchor is repeated at regular intervals. In this way, changes in the network may be taken into account, and another anchor may be chosen as the responding anchor in view of said changes.

Figure 7:
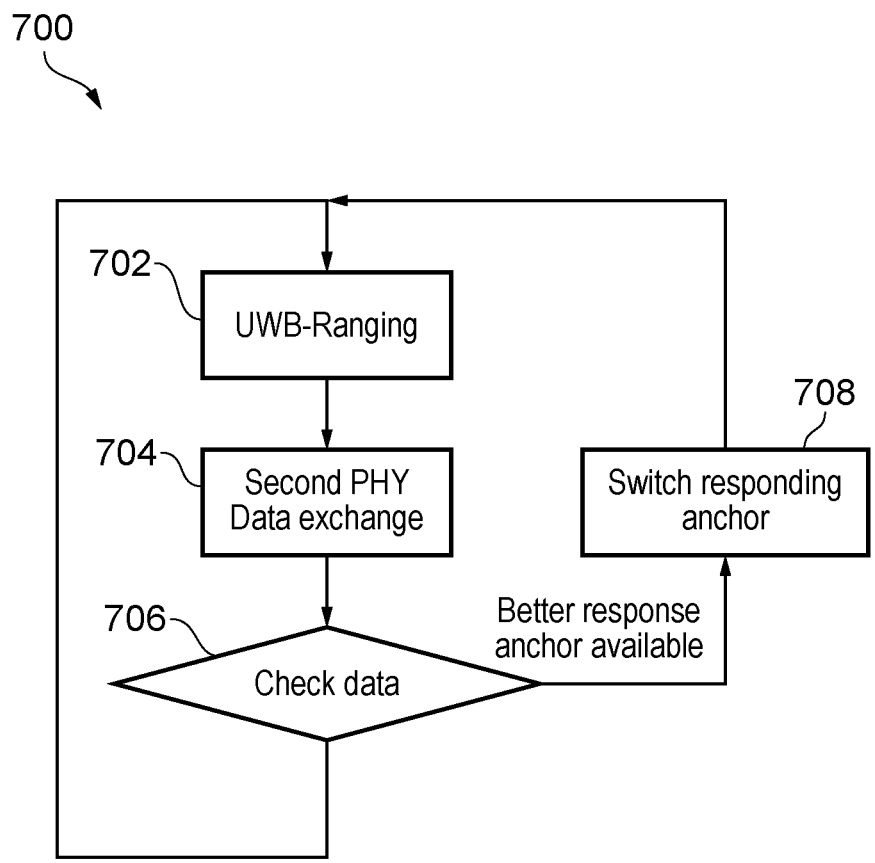
FIG. 7 shows an illustrative embodiment of a method for determining a responding anchor.

FIG. 7 shows an illustrative embodiment of a method 700 for determining a responding anchor. In particular, FIG. 7 shows an example of how the responding anchor may be determined. In a first state 702, there is an UWB message exchange with all the anchors listening (UWB-Ranging state). After this ranging, in a second state 704 the further communication network (secondary channel) may be used for exchanging or collecting timestamps and also for exchanging or collecting signal quality information, e.g. RSSI values or SNR values (Second PHY Data exchange state). Based on the collected signal quality information, a decision on switching or not switching the responding anchor can be made in a third state 706 (Check data state). If the anchor should be changed the further communication network may be used for communicating this to all the anchors in fourth state 708 (Switch responding anchor state). In this way, only the anchor with the best signal quality is responding and it is less likely that collisions between the anchors will occur. More specifically, collisions can be avoided because every anchor will know that the responding anchor has changed and that only the responding anchor may answer to the poll message. After switching the responding anchor, the system is again in the UWB-Ranging state 702 with a different anchor responding to the poll message of the node. If the anchor should not be changed, the system may enter immediately into the UWB-Ranging state 702 without changing the responding anchor. When the system has reached the UWB-Ranging state 702 the message exchange may be reinitiated.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 ultra-wideband communication network
102 node
104 first anchor
106 second anchor
108 third anchor
200 timing diagram
300 ultra-wideband communication network
302 node
304 first anchor
306 second anchor
308 third anchor
400 timing diagram
500 method for determining the position of a node
502 node transmits a poll message to a plurality of anchors
504 a first anchor of said plurality transmits a response message to the node and to one or more other anchors of said plurality of anchors
506 a processing unit calculates the position of the node using timing information of the poll message transmission by the node, of the poll message reception by the plurality of anchors, of the response message transmission by the first anchor, and of the response message reception by the node and the other anchor or anchors
508 ultra-wideband communication network
510 node
512 first anchor
514 second anchor
516 third anchor
600 timing diagram
700 method for determining a responding anchor
702 ultra-wideband ranging state
704 data exchange through secondary communication network
706 check data
708 switch responding anchor

The invention claimed is:

1. A method for determining the position of a node in a communication network, wherein said network comprises said node and a plurality of anchors, the method comprising:
    the node transmits a poll message to the plurality of anchors;

a first anchor of said plurality transmits a response message to the node and to one or more other anchors of said plurality of anchors, wherein the first anchor is selected from among the plurality of anchors to transmit the response message in dependence on the strength or the quality of a probing signal received by the plurality of anchors, wherein the probing signal is transmitted through a further communication network, wherein each of the plurality of anchors determines a signal strength or quality parameter value and the plurality of anchors exchange the signal strength or quality parameter values between each other, and wherein the plurality of anchors select the anchor that provided the highest signal strength or quality parameter value as the first anchor;

a processing unit calculates the position of the node using timing information of the poll message transmission by the node, of the poll message reception by the plurality of anchors, of the response message transmission by the first anchor, and of the response message reception by the node and the other anchor or anchors.

2. The method of claim 1, wherein the communication network is an ultra-wideband communication network.

3. The method of claim 1, wherein the timing information comprises timestamps.

4. The method of claim 1, wherein the processing unit is comprised in the node, in one of the plurality of anchors or in an external device.

5. The method of claim 1, wherein the timing information is transmitted to the processing unit through said communication network or through a further communication network.

6. The method of claim 5, wherein the further communication network is a ZigBee network, a Bluetooth low energy network, or a Wi-Fi network.

7. The method of claim 1, wherein the anchors perform regular time-of-flight measurements between each other to determine the distance between each other.

8. The method of claim 1, wherein the signal strength or quality parameter value is a received signal strength indicator, RSSI, value, or a signal-to-noise ratio, SNR, value.

9. The method of claim 1, wherein selecting the first anchor is repeated at regular intervals.

10. A computer program stored on a non-transitory medium comprising executable instructions that, when executed, carry out or control the method of claim 1.

11. The method of claim 1, wherein the first anchor is characterized as a responding anchor and other anchors of the plurality of anchors are characterized as passive anchors that do not transmit a response message in response to the poll message from the node.

12. A system for determining the position of a node in a communication network, the system comprising said network and a processing unit, wherein said network comprises said node and a plurality of anchors, wherein:

the node is configured to transmit a poll message to the plurality of anchors;

a first anchor of said plurality is configured to transmit a response message to the node and to one or more other anchors of said plurality of anchors, wherein the first anchor is selected from among the plurality of anchors to transmit the response message in dependence on the strength or the quality of a probing signal received by the plurality of anchors, wherein the probing signal is transmitted through a further communication network, wherein each of the plurality of anchors determines a signal strength or quality parameter value and the plurality of anchors exchange the signal strength or quality parameter values between each other, and wherein the plurality of anchors select the anchor that provided the highest signal strength or quality parameter value as the first anchor;

the processing unit is configured to calculate the position of the node using timing information of the poll message transmission by the node, of the poll message reception by the plurality of anchors, of the response message transmission by the first anchor, and of the response message reception by the node and the other anchor or anchors.

13. A method for determining the position of a node in a communication network, wherein said network comprises said node and a plurality of anchors, the method comprising:

the node transmits a poll message to the plurality of anchors;

a first anchor of said plurality transmits a response message to the node and to one or more other anchors of said plurality of anchors, wherein the first anchor is selected from among the plurality of anchors to transmit the response message in dependence on the strength or the quality of a probing signal received by the plurality of anchors, wherein the probing signal is transmitted through a further communication network, wherein each of the plurality of anchors determines a signal strength or quality parameter value and the plurality of anchors transmit the signal strength or quality parameter values to a first processing unit, and wherein the first processing unit selects the anchor that provided the highest signal strength or quality parameter value as the first anchor;

a second processing unit calculates the position of the node using timing information of the poll message transmission by the node, of the poll message reception by the plurality of anchors, of the response message transmission by the first anchor, and of the response message reception by the node and the other anchor or anchors.

14. The method of claim 13, wherein selecting the first anchor is repeated at regular intervals.

15. The method of claim 13, wherein the first processing unit is part of an external device.

16. The method of claim 13, wherein the first anchor is characterized as a responding anchor and other anchors of the plurality of anchors are characterized as passive anchors that do not transmit a response message in response to the poll message from the node.

* * * * *